United States Patent [19]
Pratt et al.

[11] Patent Number: 5,245,155
[45] Date of Patent: Sep. 14, 1993

[54] SINGLE POINT POWDER FEED NOZZLE FOR USE IN LASER WELDING

[75] Inventors: Vanon D. Pratt, Hamilton; Paul J. E. Monson, Loveland; Stephen Aleshin, Cincinnati, all of Ohio

[73] Assignee: General Electric Company, Cincinnati, Ohio

[21] Appl. No.: 846,506

[22] Filed: Mar. 6, 1992

[51] Int. Cl.$^5$ ............................................. B23K 26/00
[52] U.S. Cl. .......................... 219/121.63; 219/121.84
[58] Field of Search ..................... 219/121.63, 121.64

[56] References Cited

U.S. PATENT DOCUMENTS

| | | | |
|---|---|---|---|
| 3,569,660 | 3/1971 | Houldcroft | 219/121.68 |
| 4,269,868 | 5/1981 | Livsey | 427/53.1 |
| 4,270,675 | 6/1981 | Wicks et al. | 222/196 |
| 4,323,756 | 4/1982 | Brown et al. | 219/121.66 |
| 4,724,299 | 2/1988 | Hammeke | 219/121.65 X |
| 4,743,733 | 5/1988 | Mehta et al. | 219/121.65 |
| 4,804,815 | 2/1989 | Everett | 219/121.6 |
| 5,038,014 | 8/1991 | Pratt et al. | 219/121.64 |
| 5,126,530 | 6/1992 | Burgmer | 219/121.64 |

Primary Examiner—C. L. Albritton
Attorney, Agent, or Firm—Charles L. Moore, Jr.; Jerome C. Squillaro

[57] ABSTRACT

An apparatus for welding together a plurality of portions of a workpiece with a complex geometric surface includes a laser source for generating a laser beam; the laser source is positioned at a predetermined distance from the workpiece portions to form a weld bead of a selected width. The apparatus also includes a powder feed mechanism with a nozzle for depositing a chosen volume of powder per unit of time onto the workpiece surface. The powder feed nozzle includes a structure for preventing a reflected laser beam from the workpiece surface and the weld bead from being incident upon an orifice of the nozzle and thereby preventing the powder from melting and clogging the nozzle orifice. Either the workpiece or the laser source in combination with the powder feed mechanism may be mounted on a manipulator arrangement for moving either the workpiece portions or the combination of the laser source and powder feed mechanism relative to one another to deposit the weld bead along a predetermined weld path.

12 Claims, 3 Drawing Sheets

SINGLE POINT POWDER FEED NOZZLE FOR USE IN LASER WELDING

The government has rights in this invention pursuant to Contract No. F33657-88-C-2189 awarded by the Department of the Air Force.

BACKGROUND OF THE INVENTION

The present invention relates to laser welding of gas turbine engine components and the like, and more particularly, to an improved single point powder feed nozzle for use in laser welding gas turbine engine components or other workpieces which may have a complex geometric surface contour.

There are two basic categories or types of laser welding: penetration welding and surfacing or cladding type welding.

Penetration type laser welding is typically used when joining two or more solid mating pieces of material. A laser source generates a laser beam having a selected power density which acts as a heat source at the laser focus or focal point to cause the mating surfaces of the material to melt and fuse together to produce a fusion weld. During penetration welding, the laser beam is focused onto or very near the mating surfaces of the two portions being joined. To maximize penetration of the weld into the mating surfaces and to maintain weld stability, an inert plasma suppression gas, such as helium or the like, is directed at the weld puddle or bead. The volume of the directed suppression gas may be between about 5 and about 40 cubic feet per hour (cfh). A circumferential laser spray nozzle, such as that described in U.S. Pat. No. 4,724,299, issued Feb. 9, 1988, entitled: "Laser Spray Nozzle and Method" and incorporated herein in its entirety by reference, may be used to supply the plasma suppression gas and may also be used to supply a powder filler to the weld puddle.

Surfacing or cladding type laser welding involves melting the surface of a material with a laser beam and adding a filler material to the molten material surface to produce a weld deposit of substantially the filler material on the surface of the material. A surfacing or cladding type laser welding operation may be performed after a penetration type laser welding operation to cover or clad the penetration weld to eliminate low weld conditions or to provide positive reinforcement. A circumferential powder feed nozzle may be used to supply the filler material for a surfacing or cladding type laser type operation; however, a disadvantage of circumferential nozzles is that weld spatter may be created and deposited on the surfaces of the mating component or workpiece portions adjacent to the weld bead which may require additional processing, such as grinding or the like, to provide a smooth aerodynamic surface, or to allow nondestructive testing of the weld area using x-ray, fluorescent penetrant inspection (FPI) or visual inspection methods.

A device which may substantially reduce or eliminate weld spatter and simplify nondestructive testing of the weld bead is a single point powder feed nozzle as described and claimed in U.S. Pat. No. 4,730,093 and 4,743,733, entitled: "Method and Apparatus for Repairing Metal in an Article", issued Mar. 8, 1988, assigned to the same assignee as the present invention and incorporated herein in its entirety by reference. An example of a single point powder feed nozzle 10 for use with a laser welding system 11 is shown in FIG. 1. For many surfaces, particularly straight and level surfaces, the single point powder feed nozzle 10 and/or the workpiece 12 may be oriented so that a reflected laser beam 14 reflected by the workpiece surface 16 and/or the weld puddle 18 will not strike the tip 20 of powder feed nozzle 10. When laser welding a workpiece 12 which has a complex geometric surface 16, such as a convex or concave surface as shown in FIG. 1, a reflected laser beam may be reflected by the complex workpiece surface 16 or the weld puddle 18 and may strike tip 20 of the powder feed nozzle. The heat of the reflected laser beam 14 may cause melting of the powdered filler material (not shown in FIG. 1) at the nozzle tip 20 and clogging of the nozzle orifice (not shown in FIG. 1) from which the powdered filler material is discharged.

SUMMARY OF THE INVENTION

It is accordingly a primary object of the present invention to provide an improved single point powder feed nozzle for use in laser welding which is not subject to the foregoing disadvantages.

It is another object of the present invention to provide an improved single point powder feed nozzle which shadows the nozzle orifice or prevents a reflected laser beam from the surface of a workpiece being laser welded from being incident upon the nozzle orifice.

It is a further object of the present invention to provide an improved single point powder feed nozzle which can be used in conjunction with a circumferential powder feed nozzle and laser system to perform a surfacing/cladding type laser welding operation after performance of a penetration type welding operation by the circumferential nozzle on the same apparatus without requiring additional setup time.

In accordance with the present invention, an apparatus for welding a plurality of portions of a workpiece which may have a complex geometric surface together includes a laser source and focusing head, for generating a laser beam, positioned at a predetermined distance from the workpiece portions to form a weld bead of a selected width. A powder feed mechanism with a nozzle for depositing a chosen volume of powder per unit of time onto the workpiece surface is positioned relative to the laser source and may be moved in combination with the laser source to cause the powder to be deposited at a selected location relative to the laser beam and to melt on the workpiece surface and form a weld bead thereon. The nozzle has a structure to prevent clogging by preventing a reflected laser beam from the workpiece surface and/or the weld bead or puddle from being incident upon a nozzle orifice from which the powder is discharged. The apparatus further includes a manipulator mechanism for moving either the workpiece portions or the combination of the laser source and powder feed mechanism relative to one another, to deposit the weld bead along a predetermined weld path on the workpiece surface.

Other objects of the invention, together with features and advantages thereof, will become apparent from the following detailed specification when read with the accompanying drawings in which like reference numerals refer to like elements.

DETAILED DESCRIPTION OF THE PREFERRED EMBODIMENTS

Figure 1:
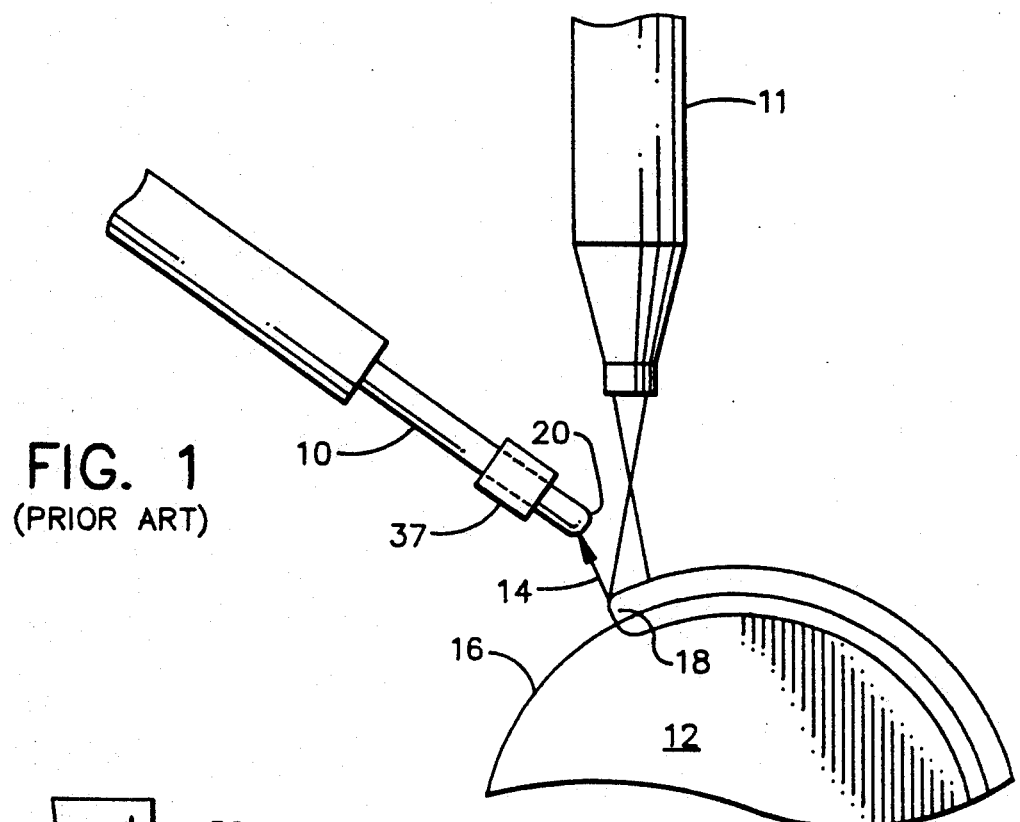
FIG. 1 is a side elevation view of a prior art single point powder feed nozzle for use with a laser welding system.
Figure 2:
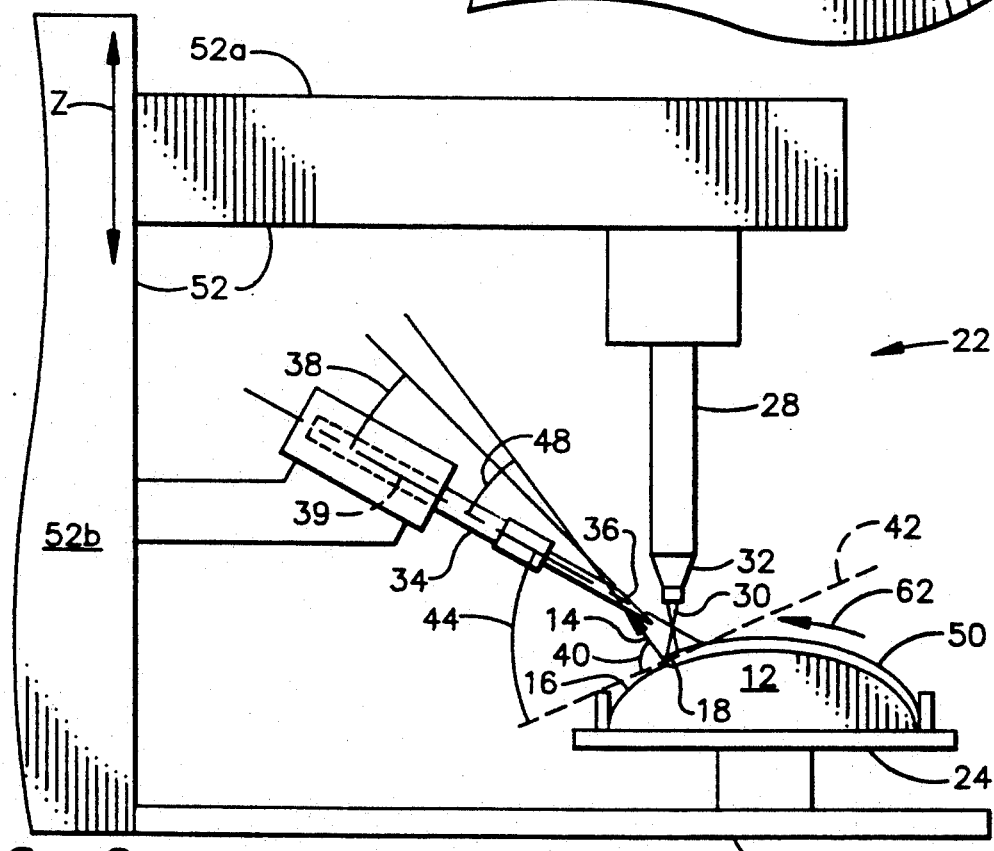
FIG. 2 is a schematic side elevation view of a single point powder feed nozzle and laser welding apparatus in accordance with the present invention.

Referring to FIG. 2, an apparatus 22 for welding together a plurality of portions of a workpiece 12 having a complex geometric surface 16 includes a fixture 24 for supporting the workpiece portions 12 during the laser welding operation. The fixture 24 may be part of or mounted to a multi-axis computer numerical control (CNC) table 26 or similar programmable workpiece positioning mechanism, such as an industrial robot or the like, for positioning and moving the workpiece 12 relative to a laser source 28 for generating a laser beam 30. Laser source 28 may include a circumferential powder feed nozzle 32 for performing penetration type laser welding operations on workpiece 12.

Figure 3:
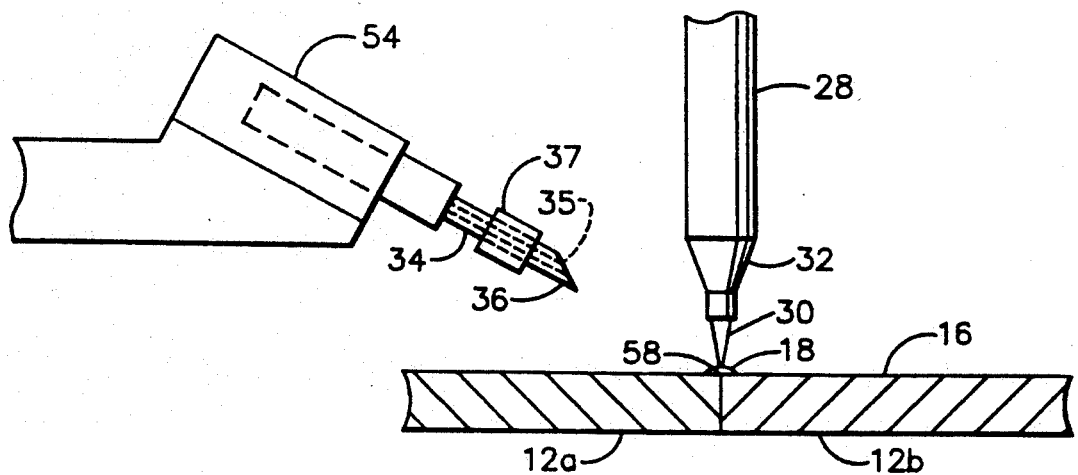
FIG. 3 is a partial side elevation view of the single point powder feed nozzle of FIG. 2 shown in a retracted position during a penetration type welding operation.

In accordance with the present invention, the apparatus 22 includes an improved single point powder feed nozzle 34 which includes clog preventive means for preventing a reflected laser beam 14 from the workpiece surface 16 or from the weld bead or puddle 18 from being incident upon a nozzle orifice 35, as best shown in FIG. 3, from which a powdered filler material (not shown in FIG. 2 for purposes of clarity) is discharged; thereby the powdered filler material is prevented from melting and clogging the nozzle orifice 35. Cooling of the nozzle 34 may be provided by a water cooled jacket 37, coil or the like, as best shown in FIG. 3. In accordance with one embodiment of the present invention, the nozzle 34 has a tip 36 which is formed at a predetermined angle 38, relative to a longitudinal axis of the nozzle 34 as illustrated by chain line 39 in FIG. 2. The predetermined angle 38 is determined in accordance with an expected worst case angle of reflection 40 of the reflected laser beam 14 from the workpiece surface 16 relative to a tangent 42 to the workpiece surface 16 at the location corresponding to the point of incidence of the laser beam 30 onto the surface 16. The predetermined angle 38 of tip 36 further includes compensation for any change or decrease in the angle of reflection 40 which may be caused by the weld puddle or bead 18. Described in more detail, the predetermined angle 38 at which nozzle tip 36 is formed to prevent the reflected laser beam 14 from being incident upon the nozzle orifice 35 is substantially equal to the minimum expected angle of reflection or the expected worst case angle of reflection 40 of the reflected laser beam 14 from the complex geometric surface 16 relative to the tangent 42 to the surface 16 at a location corresponding to the minimum or worst case angle of reflection 40 minus an angle 44 of the longitudinal axis 39 of nozzle 34, relative to the tangent 42 to the surface 16 at the minimum or worst case angle of reflection 40. About three to about five additional degrees are subtracted from this resulting angle 48 to provide the predetermined angle 38 which compensates for any additional degrees of reflection of the reflected laser beam 14 which may be caused by the weld bead face or puddle 18.

While apparatus 22 has been described as including a multi-axis CNC table 26 for movement of component 12 relative to laser beam 30 and powder feed nozzle 34 for depositing a weld bead or weld material 50 onto workpiece 12 to join together different portions of workpiece 12, apparatus 22 may also include or may include in lieu of multi-axis CNC table 26, an industrial robot or similar component manipulator mechanism 52 to which laser source 28 and powder feed nozzle 34 are attached for movement in combination with one another in relation to the surface 16 of workpiece 12.

Figure 4:
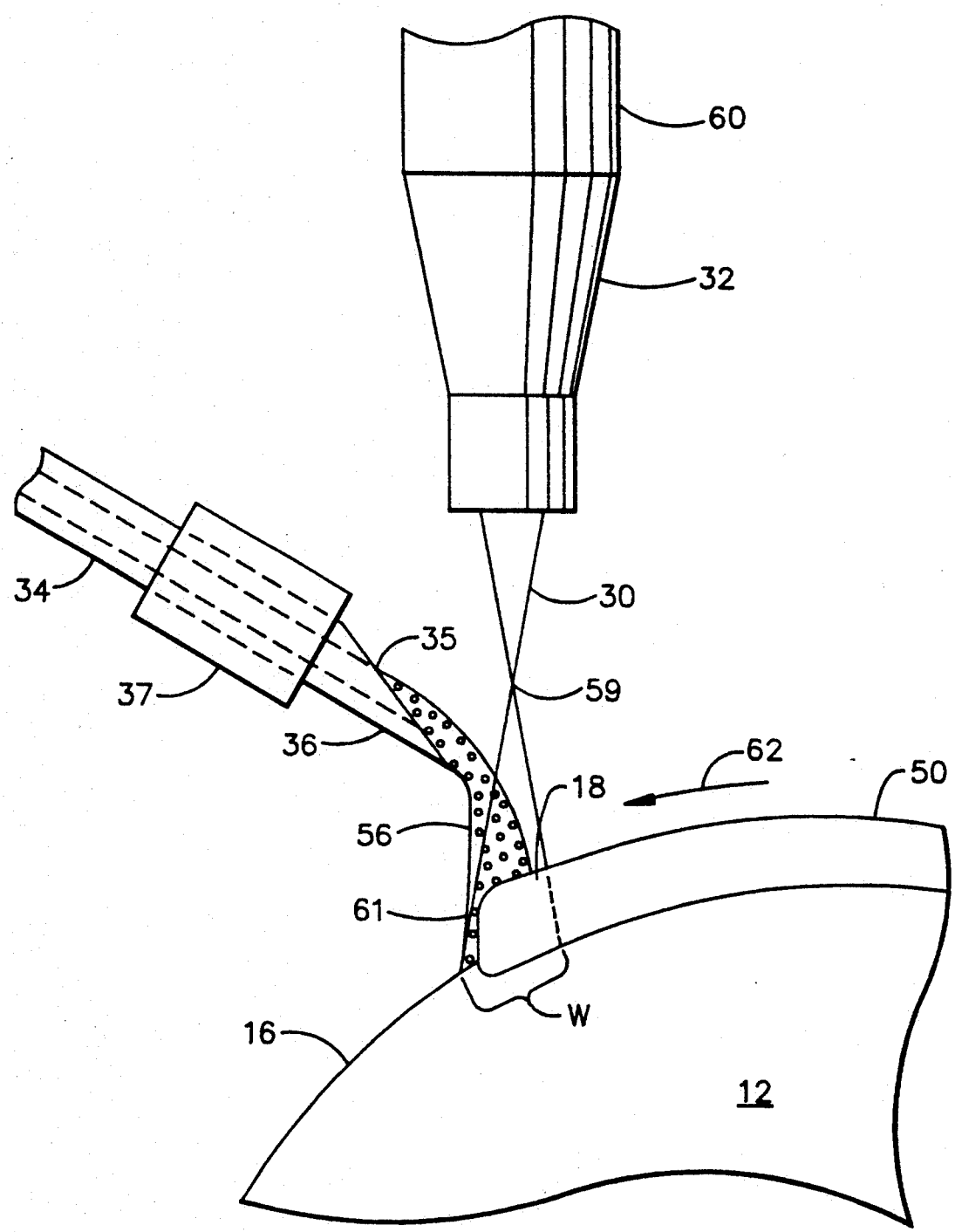
FIG. 4 is a detailed partial side elevation view of the single point powder feed nozzle of FIG. 2 in an extended position during a surfacing/cladding operation.

In accordance with one embodiment of the present invention, single point feed nozzle 34 may be attached to a mechanical activator means 54, such as a hydraulic or pneumatic actuated cylinder or the like, for moving the nozzle 34 between a retracted position as shown in FIG. 3 during performance of a penetration weld to join two portions 12a and 12b of the workpiece 12, and an extended position as shown in FIGS. 2 and 4 to deposit a powder stream 56 (FIG. 4) from nozzle 34 during a surfacing/cladding type welding operation. Referring back to FIG. 3, the nozzle 34 is retracted by actuator means 54 during a penetration type weld to prevent weld spatter from contacting and adhering to the nozzle tip 36 and thereby clogging the nozzle orifice 35. Additionally, retracting nozzle 34 will minimize reflected, incident laser energy upon the nozzle tip 36 which may cause damage to the tip or melting of any residue powder remaining in the tip 36 and therefore clogging thereof, and retracting nozzle 34 also prevents the nozzle from contacting the surfaces being joined if the surfaces are manipulated during the welding operation. It should also be noted that during a penetration type welding operation the laser beam 30 is focused substantially on the surfaces 16 of the portions 12a and 12b being joined together at the location 58 of their union. Additionally, if required, powder may be fed circumferentially from the circumferential powder feed nozzle 32 of laser source 28 onto the weld puddle 18.

Referring to FIG. 4, during a surfacing/cladding type of welding operation the focus 59 of laser beam 30 is controlled by moving either the laser focusing head 60 or the workpiece 12 relative to one another to provide a selected laser beam diameter w on the complex surface 16 which corresponds substantially to the desired width of the weld bead or weld material 50 to be deposited. Additionally, during a cladding/surfacing welding operation, powder filler material 56 is fed from the single point feed nozzle 34 rather than the circumferential nozzle 32 in order to minimize weld splatter. In accordance with the present invention, the single point powder feed nozzle 34 and laser source 28 are precisely aligned relative to one another to cause the powder stream 56 to be deposited into a leading portion 61 of the molten weld bead 18 relative to a predetermined weld path indicated by arrow 62 in FIGS. 2 and 4 to substantially minimize weld spatter from being deposited adjacent to the weld bead 50. While the single point feed nozzle 34 is shown to be aligned with the weld path 62 in FIG. 4, those skilled in the art will recognize that the nozzle 34 could be oriented at any angle relative to the weld path 62 provided that the powder stream 56 can be deposited into the leading edge portion 61 of the weld bead 18; for example, the nozzle is shown to be oriented substantially orthogonally to the weld path in FIG. 3. The laser beam 30 may be defocused by either adjusting the height of multi-axis CNC table 26 or by adjusting the elevation of laser laser focusing head 60 by moving support member 52a along axis z of support member 52b as shown in FIG. 2.

Figure 5:
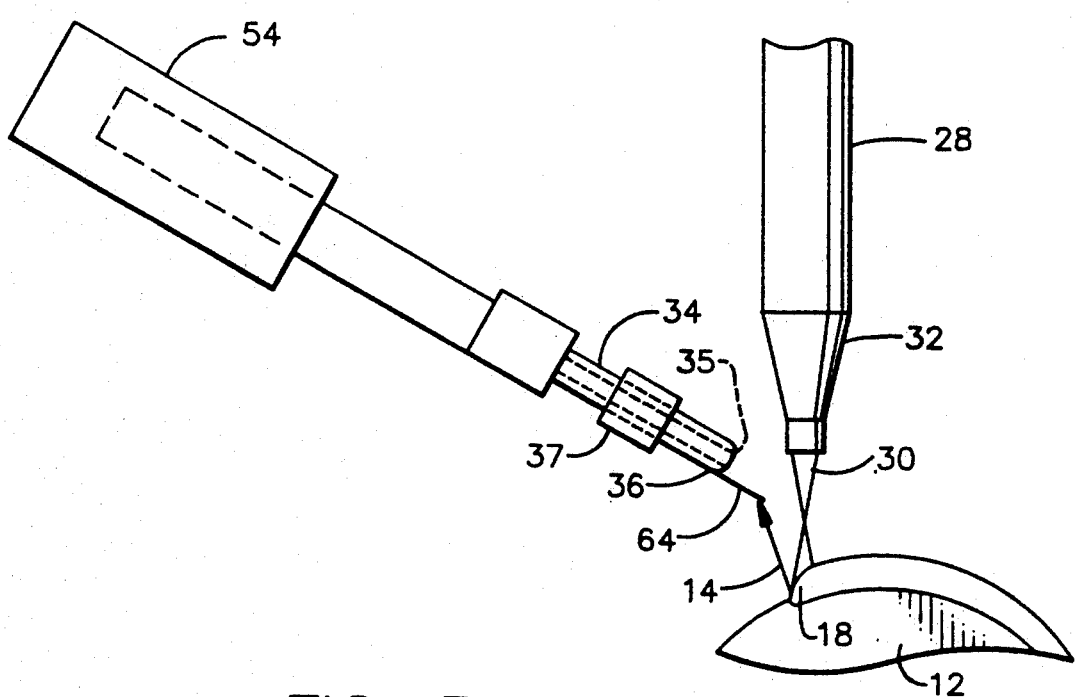
FIG. 5 is a partial side elevation view of a single point powder feed nozzle in accordance with another embodiment of the present invention.

In accordance with an alternate embodiment of the present invention, referring to FIG. 5, a lip member 64 may be formed on nozzle tip 36 beneath nozzle orifice 35 to shield the orifice from the reflected laser beam 14 and thereby prevent the laser energy from melting the powder being discharged from nozzle 34 and thereby clogging the nozzle orifice 35.

It will be readily understood by those skilled in the art that the present invention is not limited to the specific embodiments described and illustrated herein. Different embodiments and adaptations besides those shown herein and described as well as many variations, modifications and equivalent arrangements will now be apparent or be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. An apparatus for welding together a plurality of portions of a workpiece, said apparatus comprising:
    lasing means for generating a laser beam having a selected power density, said lasing means being positioned at a predetermined distance from the workpiece portions to form a weld bead of a selected width;
    powder feed means with a nozzle for depositing a chosen volume of powder per unit of time onto the workpiece surface during a welding operation, said powder feed means and said lasing means being positioned relative to one another and forming a combination to cause the powder to be deposited at a selected location in relation to said laser beam and to melt on the workpiece surface and to form said weld bead;
    clog preventive shield means for preventing a reflected laser beam from the workpiece surface and said weld bead from being incident upon a nozzle orifice from which the powder is discharged and causing the powder to melt and clog said nozzle orifice; and
    manipulator means for moving one of the workpiece portions, and said combination of said lasing means and powder feed means relative to each other, to deposit said weld bead along a predetermined weld path.

2. The apparatus of claim 1, wherein said shield means comprises a tip of said nozzle being formed at a predetermined angle relative to a longitudinal axis of said nozzle in response to an expected worst case angle of reflection of the reflected laser beam from the workpiece surface and including compensation for any additional angle of reflection caused by the weld bead.

3. The apparatus of claim 2, wherein said predetermined angle is substantially equal to a minimum angle of reflection from the complex geometric surface relative to a tangent to the surface at a location corresponding to said minimum angle of reflection minus an angle of the longitudinal axis of said nozzle relative to the tangent to the surface at the minimum angle of reflection minus an additional angle to compensate for any additional degrees of reflection caused by a face of the weld bead.

4. The apparatus of claim 1, wherein said clog preventive shield means comprises a lip extending from a tip of said nozzle to said nozzle orifice from said reflected laser beam.

5. The apparatus of claim 1, wherein said powder feed means nozzle is aligned relative to said laser beam to cause said powder to be deposited into a leading portion of the molten weld bead relative to said predetermined weld path to substantially minimize weld spatter from being deposited along said weld bead.

6. The apparatus of claim 1, wherein said lasing means includes a circumferential powder feed nozzle to perform a penetration type welding operation on the workpiece portions.

7. The apparatus of claim 6, wherein said powder feed means nozzle is mounted to an actuator means for moving said nozzle between a retracted position during the penetration type welding operation wherein powder is feed through said circumferential nozzle and an extended position for depositing a powder stream during a surfacing/cladding type welding operation.

8. An apparatus for welding together a plurality of portions of a workpiece, said apparatus comprising:
    lasing means for generating a laser beam, said lasing means including a circumferential powder feed nozzle to deposit a selected volume of powder per unit of time about said laser beam to perform a penetration type welding operation on the workpiece portions;
    powder feed means with a single point feed nozzle, separate from said lasing means, for depositing a chosen volume of powder per unit of time into a molten weld puddle formed on the workpiece surface by said laser beam during a surfacing/cladding type welding operation;
    clog preventive shield means for preventing a reflected laser beam from the workpiece surface and said weld puddle from being incident upon a nozzle orifice from which the powder is discharged and causing the powder to melt at the orifice and substantially block powder flow;
    manipulator means for moving one of the workpiece portions and a combination of said lasing means and said powder feed means relative to one another, to deposit a weld bead along a predetermined weld path; and
    means for moving a focal point of said laser beam relative to the workpiece surface to provide a weld bead of a selected width during the surfacing/cladding type welding operation.

9. The apparatus of claim 8, wherein said shield means comprises a tip of said single point feed nozzle being formed at a selected angle according to an expected worst case angle of reflection of the reflected laser beam from the workpiece surface and including compensation for any additional angle of reflection caused by the weld puddle.

10. The apparatus of claim 8, wherein said clog preventive shield means comprises a lip extending from a tip of said nozzle to shield said nozzle orifice from said reflected laser beam.

11. The apparatus of claim 8, wherein said single point feed nozzle is aligned relative to said laser beam to cause said powder to be deposited into a leading portion of said weld puddle relative to said predetermined weld path to substantially minimize weld spatter from being deposited along said weld bead.

12. The apparatus of claim 8, wherein said single point feed nozzle is attached to an actuator means for moving said nozzle between a retracted position during the penetration type welding operation wherein powder is feed through said circumferential powder feed nozzle and an extended position for depositing a powder stream into a leading portion of said weld puddle during a surfacing/cladding type welding operation.

* * * * *